(12) United States Patent
Kaiser

(10) Patent No.: US 6,633,166 B1
(45) Date of Patent: Oct. 14, 2003

(54) METHOD FOR GENERATING AN ERROR SIGNAL IDENTIFYING A SHORT CIRCUIT

(75) Inventor: Steffen Kaiser, Berlin (DE)

(73) Assignee: Siemens Aktiensellscraft, Munich (DE)

( * ) Notice: Subject to any disclaimer, the term of this patent is extended or adjusted under 35 U.S.C. 154(b) by 0 days.

(21) Appl. No.: 09/856,042

(22) PCT Filed: Nov. 19, 1999

(86) PCT No.: PCT/DE99/03745
§ 371 (c)(1),
(2), (4) Date: Aug. 27, 2001

(87) PCT Pub. No.: WO00/31849
PCT Pub. Date: Jun. 2, 2000

(30) Foreign Application Priority Data

Nov. 20, 1998 (DE) .......................... 198 55 006

(51) Int. Cl.⁷ .................. G01R 31/08; G01R 27/00; H02H 3/32; G06F 19/00
(52) U.S. Cl. .................. 324/522; 324/525; 361/80; 361/81; 700/293; 702/58; 702/59; 702/65
(58) Field of Search .................. 324/86, 512, 525, 324/522, 120, 555; 361/79, 80, 81, 86, 87, 62, 64; 700/292, 293; 702/57, 58, 59, 65

(56) References Cited

U.S. PATENT DOCUMENTS

| | | | | |
|---|---|---|---|---|
| 5,352,983 A | * | 10/1994 | Eriksson et al. | 324/522 |
| 5,446,387 A | * | 8/1995 | Eriksson et al. | 324/522 |
| 5,608,327 A | * | 3/1997 | Jones et al. | 324/522 |

FOREIGN PATENT DOCUMENTS

| | | |
|---|---|---|
| EP | 0406809 A2 | 7/1990 |
| GB | 2288930 A | 4/1994 |
| WO | 93/13582 | 7/1993 |

OTHER PUBLICATIONS

Jongepier et al. 'Adaptive distance protection of a double circuit line', (IEEE Transactions on Power Delivery, vol. 9, No. 3, Jul. 1994 pp. 1289–1297).*

"Digitaler Abzweigschutz Fur Hochstspannungsleitungen" 7SA513 V3.2 der Siemens AG 1995 S.329.

"Schutztechnik in Elektroenergiesystemen" VDE–Verlag Gmbh Dr.–Ing. Heinz Clemens, Prof. Dr. Klaus Rothe S. 94–99 93/13582.

* cited by examiner

Primary Examiner—Anjan K. Deb
(74) Attorney, Agent, or Firm—Morrison & Foerster LLP

(57) ABSTRACT

The invention is directed to a method for producing a fault signal indicating a short-circuit between a first phase conductor and a second phase conductor of two different, parallel-running, three-phase power transmission lines. The method produces a fault signal indicating a short-circuit which has occurred between a first phase conductor and a second phase conductor of a power transmission arrangement.

5 Claims, 1 Drawing Sheet

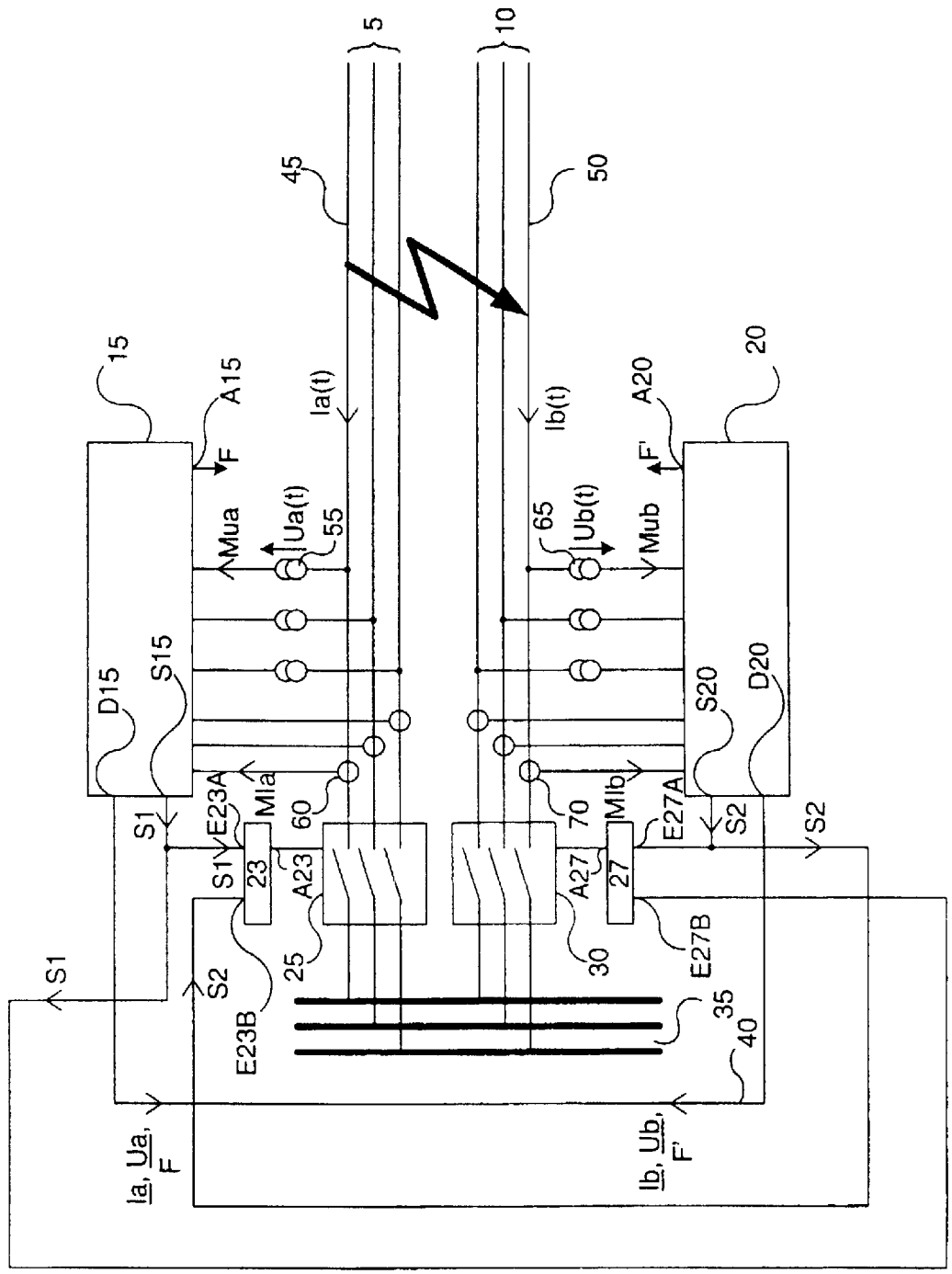

METHOD FOR GENERATING AN ERROR SIGNAL IDENTIFYING A SHORT CIRCUIT

This application claims priority to International Application No. PCT/DE99/03745 which was published in the German language on Jun. 2, 2000.

TECHNICAL FIELD OF THE INVENTION

The invention is directed to a distance protection device for power transmission lines.

BACKGROUND OF THE INVENTION

Three-phase power transmission lines can be monitored with the aid of distance protection devices for the occurrence of single-pole or multipole short-circuits or ground faults (see the manual on the Siemens distance protection device "Digitaler Abzweigschutz für Höchstspannungsleitungen" 7SA513 V3.2 [Company digital branch protection for very high voltage lines] from Siemens AG, dated 1995, page 329).

A double line, which is formed by two three-phase power transmission lines, can also be monitored. In a double line, two distance protection devices, which are each connected to one of the two three-phase power transmission lines of the double line, are fit physically at the same point on the double line. In order to avoid errors in the instrumented detection of short-circuits involving ground contact in one of the two power transmission lines, the zero current of the other power transmission line (which is not affected by a fault) is also taken into account. Specifically, this is accomplished by transmitting a measurement variable, which corresponds to the zero current of this other power transmission line and is detected by the distance protection device of this other power transmission line, to that distance protection device which is responsible for the power transmission line affected by the short-circuit, and by the receiving distance protection device evaluating this measurement variable ("Schutztechnik in Elektroenergiesystemen" VDE-Verlag GmbH, Dr.-Ing. Heinz Clemens, Prof. Dr. Klaus Rothe, [Protection technology in power electrical systems] pages 94–99).

International patent application WO 93/13582 discloses a method for producing a fault signal indicating a short-circuit which has occurred between a first phase conductor and a second phase conductor of a power transmission arrangement. The first conductor is a phase conductor of a first three-phase power transmission line, and the second phase conductor is a phase conductor of a second three-phase power transmission line which is fit physically along the first power transmission line. In this method, a current measurement variable which is proportional to the current flowing through the first phase conductor is sampled and is digitally converted to form current samples, and a voltage measurement variable, which is proportional to the conductor-ground voltage on the first phase conductor is sampled and is digitally converted to form voltage samples.

Furthermore, the international patent application WO 93/13582 discloses a method for producing a fault signal

SUMMARY OF THE INVENTION

In one embodiment of the invention, there is a method for producing a fault signal of a power transmission arrangement, comprising; a first conductor of a first three-phase power transmission line, and a second phase conductor of a second three-phase power transmission line disposed along the first power transmission line; sampling a current measurement variable MIa, and digitally converting the sampled current MIa to form current samples, sampling a voltage measurement variable MUa, and sampled and is digitally converting the sampled voltage MUa to form voltage samples, sampling a current measurement variable MIb, and digitally converting the sampled current MIb to form current samples, sampling a voltage measurement variable MUb, and digitally converting the sampled current MUb to form voltage samples, determining a complex loop impedance measured value for the conductor-conductor loop using the current and voltage samples or using auxiliary measurement variables derived from the current and voltage samples, and determining a fault signal if the loop impedance value is within a predetermined response range.

In one aspect of the invention, the current and voltage samples of the first phase conductor are detected using a measurement device connected to the first power transmission line at a first point, the current and voltage samples or the auxiliary measurement variables are transmitted via a data link to a second measurement device connected at a second point, and the loop impedance is determined and the fault signal is produced in the second measurement device using the current and voltage samples or using the auxiliary measurement variables.

In another aspect of the invention, determining a complex current and voltage vector measurement variables as auxiliary measurement variables from the current and voltage samples.

In still another aspect of the invention, the first and second measurement devices are distance protection measurement devices.

In another embodiment of the invention, there is an electronic arrangement detecting a short-circuit occurring between a first phase conductor and a second phase conductor of a power transmission arrangement, comprising a first conductor of a first three-phase power transmission line, and a second phase conductor of a second three-phase power transmission line disposed along the first power transmission line a first measurement device connected to the first power transmission line at a first point, the first measurement device samples a current measurement variable MIa and digitally converts the current MIa to form current samples, and samples a voltage measurement variable and digitally converts the voltage MUa to form voltage samples, a data link that connects the first measurement device to a second measurement device connected to the second power transmission line at a second point wherein, the data link transmits the current and voltage samples or auxiliary measurement variables derived thereof from the first measurement device to the second measurement device wherein, the second measurement device samples a current measurement variable MIb and converts the current variable MIb to form current samples, samples a voltage measurement variable MUb, and digitally converts the sampled current MUb to form voltage samples, determines a complex loop impedance value for the conductor-conductor loop using the current and voltage samples or using the auxiliary measurement variables derived the real, from the first measurement device using the current and voltage samples or using auxiliary measurement variables derived thereof from the second measurement device to produce the fault signal if the loop impedance measured value is within a predetermined response range.

BRIEF DESCRIPTION OF THE DRAWINGS

This invention will be better understood by reference to the Detailed Description taken together with the attached drawings, wherein:

FIG. 1 is a schematic of a distance protection device of the invention.

DETAILED DESCRIPTION OF THE INVENTION

The invention is directed to a method for producing a fault signal indicating a short-circuit that has occurred between a first phase conductor and a second phase conductor of two different, parallel-running, three-phase power transmission lines.

According to the invention, a current measurement variable which is proportional to the current flowing through the second phase conductor is sampled and is digitally converted to form current samples. A voltage measurement variable, which is proportional to the conductor-ground voltage, on the second phase conductor, is sampled and is digitally converted to form voltage samples. A complex loop impedance measured value is formed for the conductor-conductor loop formed by the two phase conductors, using the current and voltage samples or using auxiliary measurement variables derived from them, for the two phase conductors, and the fault signal is formed if the loop impedance measurement value is within a pre-determined response range.

The method of the invention forms a complex loop impedance value from the current and voltage samples of the two phase conductors. The method then checks whether the loop impedance value is within a pre-determined response range or response polygon.

The invention can be particularly cost-effective if commercially available standard devices for three-phase power transmission lines are used. This can be achieved by detecting the current and voltage samples of the first phase conductor using a measurement device connected to the first power transmission line at a first point. The current and voltage samples or the auxiliary measurement variables derived from the measurement device for the first phase conductor are transmitted via a data link to a second measurement device connected at a second point located in the vicinity of the first point. The current and voltage samples of the second phase conductor of the second power transmission line are then detected. Th e loop impedance is determined and the fault signal is produced in the second measurement device using the current and voltage samples or using the auxiliary measurement variables derived from them, for the two phase conductors. Hence, it is possible to use substantially conventional measurement devices for three-phase power transmission lines, provided such measurement devices are suitable for interchanging measurement data via a data link and for processing measurement data transmitted via the data link from other measurement devices.

The method can be performed relatively quickly if measurement variables, which have already been pre-processed in a particularly suitable manner for determining the loop impedance, are produced and transmitted as the auxiliary measurement variable. This is achieved, for example, by forming complex current and voltage vector measurement variables as auxiliary measurement variables from the current and voltage samples.

In one embodiment, the method can be carried out using distance protection measurement devices.

In another embodiment, an arrangement using a short-circuit between a phase conductor and a second phase conductor of two different, parallel-running three-phase power transmission lines can be detected particularly easily and reliably.

This can be achieved by an arrangement for producing a fault signal, which indicates a short-circuit occurring between a first phase conductor and a second phase conductor of a power transmission arrangement. The first conductor is a phase conductor of a first three-phase power transmission line, and the second phase conductor is a phase conductor of a second three-phase power transmission line. The second three-phase power transmission line is disposed along the first power transmission line, having a first measurement device connected to the first power transmission line at a first point. The first measurement device samples a current measurement variable which is proportional to the current flowing through the first phase conductor and digitally converts it to form current samples. The measurement device also samples a voltage measurement variable, which is proportional to the conductor-ground voltage on the first phase conductor, and digitally converts it to form voltage samples. A data link connects the first measurement device to a second measurement device, which is connected to the second power transmission line at a second point located in the vicinity of the first point. The current and voltage samples or auxiliary measurement variables derived thereof are transmitted to the second measurement device. The second measurement device is designed to sample a current measurement variable which is proportional to the current flowing through the second phase conductor and digitally converts it to form current samples. The second measurement device also samples a voltage measurement variable which is proportional to the conductor-ground voltage on the second phase conductor and digitally converts it to form voltage samples. The device then forms a complex loop impedance value for the conductor-conductor loop formed by the two phase conductors, using the current and voltage samples or using the auxiliary measurement variables. The first measurement device, using its own current and voltage samples or using auxiliary measurement variables, derived thereof, produces the fault signal if the loop impedance measured value is within a pre-determined response range.

FIG. 1 shows a schematic of one embodiment of the invention. A first power transmission line 5 is connected to a first distance protection device 15. A second power transmission line 10 is connected to a second distance protection device 20.

The first distance protection device 15 is connected via a control output S15 to an input E23A of a first tripping device 23. The tripping device 23 also includes input E23B from control output S20 of the second distance protection device 20 and output A23, which is connected to circuit-breaker 25. The circuit-breaker 25 disconnects those phase conductors of the first power transmission line 5 affected by a fault when appropriately actuated by the tripping device 23 and/or when appropriately actuated by the first distance protection device 15 and the second distance protection device 20.

The second distance protection device 20 is connected in a corresponding manner having a control output S20 to an input E27A of a second tripping device 27. Tripping device 27 also include input E27B of from control output S15 of the first distance protection device 15, and output A27 which is connected to second circuit-breaker 30. Second circuit-breaker 30 disconnects those phase conductors of the second power transmission line 10 which are affected by a fault when appropriately actuated by the second tripping device 27 and/or when appropriately actuated by the first distance protection device 15 and the second distance protection device 20.

The distance protection device of the invention also includes a busbar 35 that connects the phase conductors of the two power transmission lines 5 and 10 to one another in pairs. The two distance protection devices 15 and 20 are connected to one another via respective data connections, D15 and D20, by means of a data line 40 as a data link. This arrangement allows a fault signal F or F', respectively, to be produced when a short-circuit occurs between a phase conductor of the first power transmission line 5 and a phase conductor of the second power transmission line 10.

For example, if a short-circuit has occurs between a first phase conductor 45 of the first power transmission line 5 and a second phase conductor 50 of the second power transmission line 10 be used to monitor all the possible phase conductor pairs of the two power transmission lines 5 and 10 for the occurrence of a short-circuit. A first voltage transformer 55 converts the conductor-ground voltage Ua(t) on the first phase conductor 45 to a voltage measurement variable MUa. The voltage measurement variable is proportional to this conductor-ground voltage, and is transmitted to the first distance protection device 15. At the same time, a first current transformer 60 converts the current Ia(t) which is flowing in the first phase conductor 45 to a current measurement variable MIa. The current measurement variable MIa is proportional to this current, and transmits this to the first distance protection device 15.

The corresponding measured values are also determined in a corresponding manner for the second phase conductor 50, and are transmitted to the second distance protection device 20. Specifically, the conductor-ground voltage Ub(t) on the second phase conductor 50 is converted by a voltage transformer 65 to a voltage measurement variable MUb. The voltage measurement variable MUb, is proportional to this voltage, is then transmitted to the second distance protection device 20. The current Ib(t) which is flowing through the second phase conductor 50 is converted by a second current transformer 70 to a current measurement variable MIb. The current measurement variable MIb, which is proportional to this phase current Ib(t), is then transmitted to the second distance protection device 20. The respective current and voltage measurement variables MUa, MIa, MUb and MIb are each sampled in the distance protection devices 15 and 20, and are digitally converted to form current and voltage samples. Complex current vector and voltage vector measurement variables are determined from the respective current and voltage samples in each of the two distance protection devices 15 and 20. These current and voltage samples are then transmitted via data line 40 to the respective other distance protection device. Specifically, a complex voltage vector measurement variable Ua, which is formed from the voltage measurement variable MUa, and a complex current vector measurement variable Ia, which is formed from the current measurement variable MIa, are transmitted from the first distance protection device 15, via data line 40, to the second distance protection device 20. As a result, the complex voltage vector measurement variable Ua indicates the conductor-ground voltage Ua(t) on the phase conductor 45, and the complex current vector measurement variable Ia indicates the phase current Ia(t) flowing through the first phase conductor 45.

In the same way, a complex current vector measurement variable Ib and a complex voltage vector measurement variable Ub are transmitted from the second distance protection device 20 to the first distance protection device 15. As a result, the complex voltage vector measurement variable Ub indicates the conductor-ground voltage Ub(t) on the second phase conductor 50, and the current vector measurement variable Ib indicates the phase current Ib(t) flowing through the second phase conductor 50.

A loop impedance measured value Z2, represented by equation (1), is formed in the second distance protection device 20 from the current and voltage vector measurement variables Ia, Ib, Ua and Ub.

$$Z2 = \frac{Ub - Ua}{Ib - Ia}$$

The resultant loop impedance measured value Z2 is evaluated to determine its position in the complex impedance plane. Specifically, the fault signal F' is produced if the loop impedance value Z2 is within a pre-determined response range or response polygon in the impedance plane.

An impedance measured value Z1, as represented by equation (2), is formed in the the first distance protection device 15 from the current and voltage vector measurement variables Ia, Ib, Ua and Ub.

$$Z1 = \frac{Ua - Ub}{Ia - Ib} \qquad (2)$$

If the loop impedance measured value Z1 is within the pre-determined response polygon, the first distance protection device 15 produces fault signal F, that is, a fault signal which indicates that a short-circuit has occurred between the first phase conductor 45 and the second phase conductor 50.

When the first distance protection device 15 generates fault signal F, a control signal S1 is produced at the control output S15. The control signal is then passed on to the two tripping devices 23 and 27. The control signal S1 indicates which phase conductors are affected by a short-circuit, i.e., phase conductors 45 and 50, and must therefore be disconnected. If such a control signal S1 is present, the tripping devices 23 and 27 actuate the circuit-breakers 25 and 30 such that they disconnect those phase conductors of the two power transmission lines 5 and 10 which are affected by the fault.

The second distance protection device 20 operates in a like manner. If the second distance protection device 20 generates fault signal F', a control signal S2 is produced. Control signal S2 is then passed on to the two tripping devices 23 and 27. The control signal S2 indicates which phase conductors are affected by a short-circuit and must therefore be disconnected. If control signal S2 is present, the tripping devices 23 and 27 actuate the circuit- breakers 25 and 30 such that they disconnect those phase conductors 45 and 50 which are affected by the fault.

The fault signal F produced by the first distance protection device 15 is emitted from output A15 of the first distance protection device 15 fault signal F is also transmitted via data line 40 to the second distance protection device 20. Similarly, fault signal F' produced by the second distance protection device 20 is emitted from output A20 of the second distance protection device 20. Fault signal F is also transmitted via data line 40 to the first distance protection device 15. Thus, in the event of a short-circuit, each of the two distance protection devices has both the fault signal produced thereof as well as the fault signal produced by the respective other distance protection device.

In one embodiment, an appropriate configuration of the two distance protection devices 15 and 20 makes it possible for the two distance protection devices to emit a respective control signal S1 or S2 to the two tripping devices 23 and 27 only when fault signals F and F' have been produced by each of the two distance protection devices 15 and 20. In this way, spurious disconnection of phase conductors resulting from a malfunction of one of the two distance protection devices can thus reliably be prevented.

In another embodiment, the invention provides a means to transmit the current values and samples or else other auxiliary measurement variables derived from these current values and samples via data line 40 instead of the current and voltage vector measurement variables (Ua, Ub, Ia, Ib). In this case, it is, of course, necessary to ensure that the corresponding current and voltage vector measurement variables (Ua, Ub, Ia, Ib) or other corresponding measurement variables, which are suitable for calculating the loop impedance measured value, can be obtained from the auxiliary measurement variables.

A radio link can also be used, by way of example, as the data link, instead of the data line 40.

What is claimed is:

1. A method for producing a fault signal of a power transmission arrangement, comprising:
    providing a first conductor of a first three-phase power transmission line, and a second phase conductor of a second three-phase power transmission line disposed along the first power transmission line;
    sampling a current measurement variable MIa, and digitally converting the sampled current MIa to form current samples;
    sampling a voltage measurement variable MUa, and sampled and is digitally converting the sampled voltage MUa to form voltage samples;
    sampling a current measurement variable MIb, and digitally converting the sampled current MIb to form current samples;
    sampling a voltage measurement variable MUb, and digitally converting the sampled current MUb to form voltage samples;
    determining a complex loop impedance measured value for the conductor-conductor loop using the current and voltage samples or using auxiliary measurement variables derived from the current and voltage samples; and
    determining a fault signal if the loop impedance value is within a predetermined response range.

2. The method of claim 1,
    wherein,
    the current and voltage samples of the first phase conductor are detected using a measurement device connected to the first power transmission line at a first point,
    the current and voltage samples or the auxiliary measurement variables are transmitted via a data link to a second measurement device connected at a second point, and
    the loop impedance is determined and the fault signal is produced in the second measurement device using the current and voltage samples or using the auxiliary measurement variables.

3. The method of claim 1, further comprising:
    determining complex current and voltage vector measurement variables as auxiliary measurement variables from the current and voltage samples.

4. The method of claim 2, wherein the first and second measurement devices are distance protection measurement devices.

5. An electronic arrangement detecting a short-circuit occurring between a first phase conductor and a second phase conductor of a power transmission arrangement, comprising:
    a first conductor of a first three-phase power transmission line, and a second phase conductor of a second three-phase power transmission line disposed along the first power transmission line;
    a first measurement device connected to the first power transmission line at a first point,
        the first measurement device samples a current measurement variable MIa and digitally converts the current MIa to form current samples, and
        samples a voltage measurement variable and digitally converts the voltage MUa to form voltage samples; and
    a data link that connects the first measurement device to a second measurement device connected to the second power transmission line at a second point, wherein the data link transmits the current and voltage samples or auxiliary measurement variables derived thereof from the first measurement device to the second measurement device
    wherein, the second measurement device samples a current measurement variable MIb and converts the current variable MIb to form current samples,
    samples a voltage measurement variable MUb, and digitally converts the sampled current Mub to form voltage samples,
    determines a complex loop impedance value for the conductor-conductor loop using the current and voltage samples or using the auxiliary measurement variables derived thereof, from the first measurement device using the current and voltage samples or using auxiliary measurement variables derived thereof from the second measurement device and
    to produce the fault signal if the loop impedance measured value is within a pre-determined response range.

* * * * *